United States Patent Office 3,450,557
Patented June 17, 1969

3,450,557
POLYOLEFIN COATING COMPOSITION
Richard A. Dratz and Ralph A. Nelson, Appleton, Wis., assignors to Thilmany Pulp and Paper Company, Kaukauna, Wis., a corporation of Wisconsin
No Drawing. Filed May 2, 1966, Ser. No. 546,555
Int. Cl. B32b 27/08, 33/00, 27/32
U.S. Cl. 117—76                                    7 Claims

ABSTRACT OF THE DISCLOSURE

Polyolefin articles which are ink-receptive and glueable with a polyvinyl alcohol coating thereon having at least about 88 percent hydrolyzed acetate radicals, the coating including between about 1 and 10 percent polymerized ethylenimine.

---

This invention relates generally to the coating of polyolefins with an ink-receptive coating, and more particularly it relates to a coated, ink-receptive and glueable polyolefin article and to an adherent, ink-receptive, glueable, waterproof coating composition for coating polyolefins.

It is generally known that a polyolefin surface is not ink-receptive, that is, conventional printing inks, whether water base, alcohol base, nitrocellulose base or oil base, do not adhere to a polyolefin surface with sufficient strength to prevent destruction of the printed matter by normal abrasive forces encountered during handling. Ink applied to a polyolefin surface becomes smeared by rubbing of the printing, or may be lifted from the printed polyolefin surface by contact with a tacky material such as cellophane tape.

Another problem often encountered in printing polyolefin surfaces is that the printing members mar the soft polyolefin surface. In order to prevent the printing members from destroying or injuring the polyolefin surface, lighter printing pressures than would ordinarily be desired must be used. It is also difficult to glue polyolefin surfaces using conventional low cost starch base glues.

Various methods have been developed for treating polyolefin films in order to render the surface of the film ink-receptive. One such method includes oxidizing the polyolefin surface by irradiation or by heat treatment so that inks of conventional types will adhere to the oxidized surface. However, the oxidation of the polyolefin surface is not permanent, and is dissipated by handling of the polyolefin during passage of the polyolefin over rollers, conveyors, and other handling devices or during protracted storage. Accordingly, the ink must be applied to the polyolefin surface within a relatively short period of time after the oxidizing treatment. Further, treatment of the polyolefin surface in this manner does not improve the mar resistance or the glueability of the polyolefin and light printing pressure and special glues are still required.

It has also been proposed to coat the polyolefin surface with an adherent, ink-receptive coating instead of treating the polyolefin to oxidize the surface. Such coatings would also enhance the mar resistance and the glueability of the polyolefin film. However, the known ink-receptive coatings which are adherent to a polyolefin surface, and which have desired characteristics, require particular conditions and apparatus for applying the coating to the polyolefin.

Discontinuous coatings have also been proposed for coating a previously oxidized polyolefin surface to retard the dissipation of the oxidized surface. However, the discontinuous coatings are not ink-receptive in themselves and the ink becomes bonded to the polyolefin surface by contact with the treated surface through the holes in the discontinuous coatings.

It is a principal object of the present invention to provide an ink-receptive polyolefin article. Another object is to provide an adherent, ink-receptive, glueable, waterproof coating composition for coating polyolefins which may be applied to the polyolefin at any time using conventional coating techniques. An additional object is to provide an ink-receptive, glueable coated polyolefin article in which the polyolefin does not need to be treated prior to printing. A further object is to provide a coated, ink-receptive, glueable polyolefin sheet in which the ink-receptive coating protects the polyolefin film from marring during printing.

These and other objects of the invention may be readily understood from the following detailed description.

Very generally, the present invention is directed to a polyolefin article having an ink-receptive coating thereon which comprises partially hydrolyzed or substantially fully hydrolyzed polyvinyl alcohol and between about 1 percent and about 5 percent by weight of the polyvinyl alcohol solids of polymerized ethylenimine solids, and to such a coating composition. In a more specific embodiment of the invention the ink-receptive coating also includes between about 0.05 percent and about 0.2 percent by weight of the polyvinyl alcohol solids of potassium pyroantimonate.

For purposes of the present invention the term "polyolefin" is defined as a polymer or copolymer of one or more straight or branched chain lower aliphatic alkenes, for example, polyethylene, polypropylene, polyalphabutylene, polyisopropylene, and most preferably polyethylene.

The polyolefin article to which the ink-receptive coating is applied may be in any desired shape or form. In this connection, the polyolefin article may be a backed or unbacked polyolefin film, a laminate or a polyolefin coated article. A paper or foil backed polyolefin film is particularly desired where the printed polyolefin article is to be used as a packaging material.

The adherent, ink-receptive coating composition includes as its principal constituent partially hydrolyzed or substantially fully hydroylzed polyvinyl alcohol. The selection of the polyvinyl alcohol is generally dependent upon the intended use of the coated polyolefin. Partially hydrolyzed polyvinyl alcohol coatings are susceptible to deterioration upon exposure to moisture or humid atmosphere, and untreated partially hydrolyzed polyvinyl alcohol coatings are generally not acceptable when the coated polyolefin is intended for use as a packaging material. However, in accordance with the present invention, acceptable coatings for polyolefins intended for use as packaging materials may be obtained utilizing polyvinyl alcohol having as low as 88 percent of the acetate radicals hydrolyzed.

The ink-receptive coating composition has the best waterproof characteristics when the polyvinyl alcohol is substantially fully hydrolyzed. By the term "substantially fully hydrolyzed" it is meant polyvinyl alcohol in which at least about 98 percent of the acetate radicals are hydrolyzed. Suitable examples of available polyvinyl alcohols which are substantially completely hydrolyzed for purposes of the present invention include Lemol 30–98, sold by Borden Co.; Vinol 125 sold by Air Reduction Co.; Gelvatol 0–90, sold by Monsanto Chemical Co.; and Elvano 72–60 sold by Du Pont Chemical Co.

For some uses it is not necessary that the coated polyolefin have the best waterproof characteristics, and in some instances it is even desirable that the polyvinyl alcohol coating on the surface of the polyolefin be slowly solubilized by exposure to the water vapor present in the atmosphere. In such instances where a lesser degree of water resistance may be tolerated or desired, partially hydrolyzed polyvinyl alcohol may be utilized. Suitable examples of partially hydrolyzed polyvinyl alcohols which may be utilized in the present invention include Gelvatol 20–30 sold by Monsanto; Elvanol 52–22 sold by DuPont and Lemol 42–88 sold by Borden.

Although substantially fully hydrolyzed polyvinyl alcohol has limited ink receptivity and limited glueability, it is generally desirable to improve the ink receptivity and glueability of substantially fully hydrolyzed polyvinyl alcohol coatings on polyolefins. Further, substantially fully hydrolyzed polyvinyl alcohol does not bond well to polyolefin and is not sufficiently adherent to withstand the mechanical forces to which the coated polyolefin article may be subjected during handling. Partially hydrolyzed polyvinyl alcohol is more adherent to polyolefins than substantially fully hydrolyzed polyvinyl alcohol, but has only limited ink receptivity and glueability. It has been discovered that an adherent, substantially fully hydrolyzed or partially hydrolyzed polyvinyl alcohol coating composition may be obtained which has improved ink-reception and glueability if a minor amount of polymerized ethylenimine is added to the polyvinyl alcohol coating composition. A polyvinyl alcohol coating composition containing polymerized ethylenimine readily bonds to a polyolefin surface and provides a tough, adherent, ink-receptive, glueable coating on the polyolefin surface. The coating substantially improves the mar resistance of the polyolefin, and the coating may be glued with conventional low cost glues.

A preferred coating composition in accordance with the present invention contains between about 1 percent and about 5 percent of polymerized ethylenimine solids by weight of the polyvinyl alcohol solids. However, there does not appear to be any definitive upper or lower limit to the amount of polymerized ethylenimine which may be employed, although below about 1 percent by weight of polymerized ethylenimine the adherence of the polyvinyl alcohol coating to the polyolefin is somewhat reduced. Similarly, at levels above about 5 percent by weight, additional amounts of polymerizing ethylenimine do not provide corresponding improvement in the adherence of the polyvinyl alcohol coating to the polyolefin. Additional amounts of polymerized ethylenimine, up to about 10 percent by weight, however, do not deleteriously affect the coating.

The polymerized ethylenimine may have a molecular weight between about 30,000 and about 40,000, and is commercially available as a 50 percent solids solution from Chemirad under the tradename Polymin P and from Dow Chemical Co. under the tradename Montrek at 33 percent active polymerized ethylenimine.

A coating composition which includes partially hydrolyzed or substantially fully hydrolyzed polyvinyl alcohol and polymerized ethylenimine provides a superior adherent, ink-receptive, glueable coating when applied to a polyolefin surface. Such coating compositions are quite suitable for many uses, and when the polyvinyl alcohol is a substantially fully hydrolyzed polyvinyl alcohol, the coating composition has good waterproof characteristics. However, when the polyvinyl alcohol is not substantially fully hydrolyzed or when the polyolefin article to which the ink-receptive coating composition is applied will be exposed to extreme moisture conditions, it has been found that the addition of between about 0.05 percent and about 0.2 percent by weight of the polyvinyl alcohol solids of potassium pyroantimonate ($K_2H_2Sb_2O_7$) improves the waterproof characteristics of the ink-receptive coating. The use of potassium pyroantimonate to improve the water resistance of starch coatings has been known for some time. However, it has not been recognized that the use of extremely low levels of potassium pyroantimonate, much less than that required in starch coatings, would increase the water resistance of partially hydrolyzed polyvinyl alcohol to the point that it could be used as an ink-receptive coating for polyolefin materials which would be exposed to moist or humid environments. Also, a substantially fully hydrolyzed polyvinyl alcohol, to which between about 0.05 and about 0.2 percent potassium pyroantimonate is added may be utilized as an ink-receptive coating for polyolefins which are exposed to the most severe moisture conditions.

The coating composition may be applied to the polyolefin surface to be printed and/or glued in any desired manner to obtain a substantially continuous coating. It is generally preferable to form a water base coating solution of the coating composition and apply the coating solution to the polyolefin surface in accordance with conventional coating techniques, for example, with a Mayer rod. It is also possible to apply the coating solution by spraying or by roller coating. The coated polyolefin may then be dried in the usual manner to remove the water.

The coating solution may comprise a water base vehicle containing between about 1 percent and about 12 percent by weight of the solution of polyvinyl alcohol solids. It has been found that the coating solutions containing less than about 1 percent by weight of polyvinyl alcohol do not generally provide continuous coatings, and in general the use of low polyvinyl alcohol solids coating solutions cause machine slowdown due to the large volume of water which must be removed in order to obtain a continuous coating. In some instances, however, less than one percent by weight of polyvinyl alcohol might be employed. Above about 12 percent by weight of polyvinyl alcohol increased polyvinyl alcohol concentrations do not provide a corresponding improvement in the desired characteristics of the ink-receptive coating and the rheological properties of the coating solution are disadvantageous. Of course, a greater polyvinyl alcohol concentration might be employed if desired up to that amount which would not form a good coating.

The water base vehicle for the coating solution may comprise 100 percent water, or may comprise a mixture of water and up to about 40 percent by weight of the vehicle of a saturated straight chain alcohol having from 1 to 4 carbon atoms, preferably ethanol. The use of alcohols in the vehicle provides for faster drying of the coating on the surface of the polyolefin.

The coating solution may be prepared by dispersing the polyvinyl alcohol in all or a portion of the vehicle and cooking at an elevated temperature in accordance with known procedures in order to solubilize the polyvinyl alcohol. The potassium pyroantimonate is only sparingly soluble and is preferably added to the polyvinyl alcohol solution prior to cooking. The solubilized polyvinyl alcohol solution is then cooled and the polymerized ethylenimine is added to the cooled solution. When potassium pyroantimonate is employed in the coating composition it has been discovered that superior waterproof characteristics are obtained when the pH of the coating solution is acidic. However, for purposes of handling the coating solution and for desired pH in the products a slightly acidic pH of between about 6.0 and about 6.5 is usually preferred. The pH may be adjusted by addition of any suitable acid or acid salt, for example, phosphoric acid, citric acid, or hydrochloric acid.

The coating solution may be applied to the polyolefin surface at any level which will provide a substantially continuous coating on the polyolefin surface. It has been found that good results are obtained when the preferred coating solution is applied in amounts to provide a dry coating weight of between about one-half and two pounds per ream (3,000 sq. ft.).

It has been determined that a substantially continuous coating on the polyolefin surface is desirable in order that the entire surface of the film will be ink-receptive. However, after the polyolefin surface has been coated with a continuous coating, the ink reception and glueability of the coated surface is not greatly improved by increasing the thickness of the applied coating,

EXAMPLE I

Five pounds of Elvanol 72–60, manufactured by Du-Pont, was dispersed in 40 pounds of cold water and cooked by steam injection at a temperature of 200° F. for 10 minutes. The mixture was then cooled to room temperature and diluted with an additional amount of cold water to provide 120 pounds of a polyvinyl alcohol solution. 200 grams of a 33 percent active aqueous solution of polymerized ethylenimine, sold by Dow Chemical under the tradename Montrek, was added to the polyvinyl alcohol solution. The polyvinyl alcohol solution adjusted to a pH of 6.2 with hydrochloric acid was applied to a supported matte polypropylene sheet at a level of 25.0 pounds per ream.

The substantially fully hydrolyzed polyvinyl alcohol coating when dried was found to be well-bonded to the surface of the polyethylene sheet, and when an alcohol base ink was printed upon the surface of the polyvinyl alcohol coating, the printing could not be removed either by normal abrasive forces or by sticking a strip of cellophane tape to the surface and withdrawing the tape. Further, the polyvinyl alcohol coating was found to have good waterproof characteristics upon exposure to a humid atmosphere and was only slightly solubilized by the moisture present in the atmosphere.

EXAMPLE II

Five pounds of Gelvatol 20–60 manufactured by Monsanto and 4 gms. of potassium pyroantimonate were mixed with 40 pounds of water and cooked at a temperature of 200° F. for 10 minutes. The polyvinyl alcohol solution was then cooled to room temperature and mixed with an additional amount of water to form 120 pounds of the polyvinyl alcohol solution. 125 grams of Montrek 33 percent active aqueous polymerized ethylenimine was added to the solution and the pH was adjusted to 6.5 by the addition of phosphoric acid. The polyvinyl alcohol solution was then applied to a supported high density (0.939–0.954) gloss polyethylene film at a level to provide a dry coat weight of 1.5 pounds per ream.

Upon drying a substantially continuous polyvinyl alcohol coating was formed on the surface of the polyethylene film and the coating was well-bonded to the surface of the polyethylene. When the coating was printed with nitrocellulose base ink, it was found that the printing adhered to the polyvinyl alcohol coating could not be removed by normal abrasive forces or by cellophane tape. The partially hydrolyzed polyvinyl alcohol coating containing potassium pyroantimonate had substantially improved waterproof characteristics as compared to a similar polyethylene sheet to which a similar polyvinyl alcohol coating was applied which did not contain potassium pyroantimonate. The polyvinyl alcohol coating was sufficiently waterproof for applications where there is a small likelihood of encountering excessively humid conditions.

EXAMPLE III

Five pounds of Vinol 125, manufactured by Air Reduction Company, was dispersed in 40 pounds of cold water in which 3 grams of potassium pyroantimonate was dissolved. The mixture was heated by steam injection to a temperature of 200° F. for a period of 10 minutes and was cooled to room temperature and diluted with sufficient water to form 72 pounds of polyvinyl alcohol solution. 200 grams of a 50 percent aqueous solution of Chemirad Polymin P polymerized ethylenimine was added to the polyvinyl alcohol and the pH of the solution was adjusted to between 6.0 and 6.5 by the addition of phosphoric acid.

The polyvinyl alcohol solution was applied to a supported high density (0.939–0.954) gloss polyethylene film using a Mayer rod at a level to provide a dry coat weight of 1.5 pounds per ream. A substantially continuous coating was formed on the surface of the polyethylene film upon drying and the coating was adhered to the surface of the polyethylene. The coated polyethylene was then printed with an alcohol base ink.

The printed polyethylene was then tested to determine whether the ink was sufficiently bonded to the coated polyethylene surface, and it was found that the printing could not be removed from the coated surface by normal abrasion forces or by sticking a strip of cellophane tape to the printed surface and withdrawing the tape. The coated printed polyethylene sheet was then exposed to an excessively humid atmosphere. After extended exposure to the humid atmosphere susbtantially none of the polyvinyl alcohol coating was solubilized.

EXAMPLE IV

A polyvinyl alcohol coating solution was prepared by dispersing 5 pounds of Gelvatol 0–90, obtained from Monsanto Chemical Company, in 30 pounds of water and 20 pounds of ethanol containing 2 grams of potassium pyroantimonate. The mixture was cooked at 170° F. for 10 minutes, cooled to room temperature and diluted to 90 pounds of solution with a 25 percent–75 percent mixture of ethanol and water. 80 grams of Polymin P was dissolved in the polyvinyl alcohol solution and the pH was adjusted to 4.1. The polyvinyl alcohol solution was then applied to a supported medium density (0.928–0.939) gloss polyethylene at a level to provide a polyvinyl alcohol coating of 2.0 pounds per ream.

The polyvinyl alcohol coating was adherent to the surface of the polyethylene and upon printing with a nitrocellulose base ink it was found that the ink was adherent to the surface of the polyvinyl alcohol coating. The polyvinyl alcohol coating was found to have excellent waterproof characteristics and was substantially insoluble when exposed to excessively humid surroundings.

It can be seen that an improved polyvinyl alcohol coating composition has been provided which is adherent to polyolefin surfaces, and which provides an ink-receptive, glueable, waterproof coated polyolefin article. The coating composition is readily manufactured and can be applied to the polyolefin surface utilizing conventional coating techniques. Further, it is not necessary that the coated polyolefin article be immediately printed, and it is possible to store the coated polyolefin article for extended periods of time prior to printing.

Although certain of the features of the invention have been set forth with particularity in order to accurately describe the invention, alternatives which do not depart from the spirit of the invention are contemplated.

Various of the features of the invention are set forth in the following claims.

What is claimed is:

1. A coated ink-receptive, glueable polyolefin article comprising, a polyolefin article having an adherent, ink-receptive, glueable polyvinyl alcohol coating on the surface of the article to be printed or glued, said polyvinyl alcohol having at least about 88 percent hydrolyzed acetate radicals, said coating including between about 1 and about 10 percent by weight of polymerized ethylenimine based on polyvinyl alcohol solids.

2. A coated ink-receptive, glueable polyolefin article in accordance with claim 1 where the polyvinyl alcohol coating includes between about 0.05 percent and about 0.2 percent by weight of potassium pyroantimonate based on polyvinyl alcohol solids.

3. An ink-receptive, glueable polyolefin article in accordance with claim 1 in which the acetate radicals of the polyvinyl alcohol are substantially fully hydrolyzed.

4. An ink-receptive, glueable polyolefin article in accordance with claim 2 in which the acetate radicals of the polyvinyl alcohol are substantially fully hydrolyzed.

5. An article in accordance with claim 1 wherein the polyolefin article comprises polyethylene film.

6. An article in accordance with claim 5 wherein the polyethylene film is backed with paper.

7. An article in accordance with claim 5 wherein the polyethylene film is backed with foil.

References Cited

UNITED STATES PATENTS

| | | |
|---|---|---|
| 2,239,718 | 4/1941 | Izard. |
| 2,348,039 | 5/1944 | Ulrich et al. |
| 2,961,367 | 11/1960 | Weisgerber. |
| 3,107,228 | 10/1963 | Cappuccio et al. |
| 3,251,778 | 5/1966 | Dickson et al. |
| 3,313,736 | 4/1967 | Dickson et al. |

OTHER REFERENCES

Chemirad Bulletin, "Alkylenimine Polymers," pp. 740–743 (1964).

SAMUEL H. BLECH, *Primary Examiner.*

H. ROBERTS, *Assistant Examiner.*

U.S. Cl. X.R.

117—138.8, 161; 260—29.6, 874